(12) United States Patent
Monros

(10) Patent No.: US 8,370,048 B2
(45) Date of Patent: Feb. 5, 2013

(54) POLLUTION CONTROL SYSTEM

(76) Inventor: Serge V. Monros, Huntington Beach, CA (US)

( * ) Notice: Subject to any disclaimer, the term of this patent is extended or adjusted under 35 U.S.C. 154(b) by 751 days.

(21) Appl. No.: 12/565,904

(22) Filed: Sep. 24, 2009

(65) Prior Publication Data

US 2010/0076664 A1 Mar. 25, 2010

Related U.S. Application Data

(60) Provisional application No. 61/099,758, filed on Sep. 24, 2008, provisional application No. 61/173,709, filed on Apr. 29, 2009.

(51) Int. Cl.
  *G06F 19/00* (2011.01)
  *F02M 25/06* (2006.01)
  *F02B 43/08* (2006.01)
(52) U.S. Cl. .............. 701/103; 123/1 A; 123/3; 123/574
(58) Field of Classification Search .................. 123/1 A, 123/3, 568.15, 572–574; 701/102, 103, 110, 701/114, 115
See application file for complete search history.

(56) References Cited

U.S. PATENT DOCUMENTS

| | | | | |
|---|---|---|---|---|
| 3,673,993 | A * | 7/1972 | Nakajima et al. | 123/568.26 |
| 4,183,338 | A * | 1/1980 | Lindberg | 123/573 |
| 4,856,487 | A * | 8/1989 | Furuya | 123/574 |
| 5,228,424 | A * | 7/1993 | Collins | 123/574 |
| 7,025,049 | B2 * | 4/2006 | Pietschner | 123/572 |
| 2001/0013322 | A1 * | 8/2001 | Arai et al. | 123/90.11 |
| 2003/0024489 | A1 * | 2/2003 | Balan et al. | 123/3 |
| 2007/0240649 | A1 * | 10/2007 | Freeman | 123/1 A |

FOREIGN PATENT DOCUMENTS

WO   WO 9729278 A1 * 8/1997 ................... 123/574

* cited by examiner

*Primary Examiner* — Willis R Wolfe, Jr.
(74) *Attorney, Agent, or Firm* — Kelly & Kelley, LLP

(57) ABSTRACT

The pollution control system includes a controller coupled to a sensor monitoring an operational characteristic of a combustion engine, such as engine RPM. A PCV valve having an inlet and an outlet is adapted to vent blow-by gas out from the combustion engine. A fluid regulator associated with the PCV valve and responsive to the controller selectively modulates engine vacuum pressure to adjustably increase or decrease a fluid flow rate of blow-by gas venting from the combustion engine. The controller selectively adjustably positions the fluid regulator to vary the degree of vacuum pressure to optimize the recycling of blow-by gases.

17 Claims, 7 Drawing Sheets

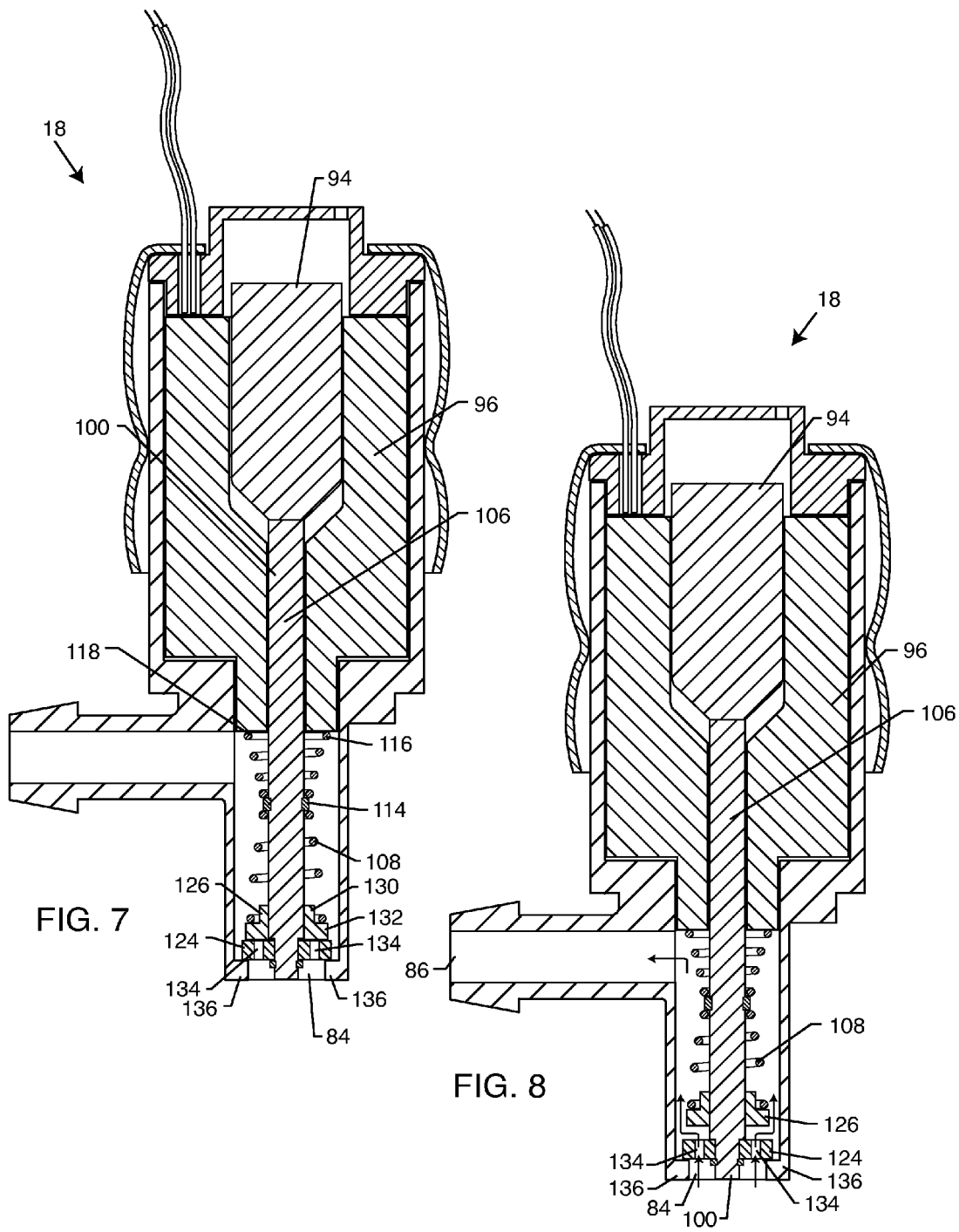

POLLUTION CONTROL SYSTEM

BACKGROUND OF THE INVENTION

The present invention generally relates to a system for controlling pollution. More particularly, the present invention relates to a system that systematically controls a PCV valve assembly that recycles engine fuel by-products, reduces emissions and improves engine performance.

The basic operation of standard internal combustion (IC) engines vary somewhat based on the type of combustion process, the quantity of cylinders and the desired use/functionality. For instance, in a traditional two-stroke engine, oil is pre-mixed with fuel and air before entry into the crankcase. The oil/fuel/air mixture is drawn into the crankcase by a vacuum created by the piston during intake. The oil/fuel mixture provides lubrication for the cylinder walls, crankshaft and connecting rod bearings in the crankcase. The fuel is then compressed and ignited by a spark plug that causes the fuel to burn. The piston is then pushed downwardly and the exhaust fumes are allowed to exit the cylinder when the piston exposes the exhaust port. The movement of the piston pressurizes the remaining oil/fuel in the crankcase and allows additional fresh oil/fuel/air to rush into the cylinder, thereby simultaneously pushing the remaining exhaust out the exhaust port. Momentum drives the piston back into the compression stroke as the process repeats itself. Alternatively, in a four-stroke engine, oil lubrication of the crankshaft and connecting rod bearings is separate from the fuel/air mixture. Here, the crankcase is filled mainly with air and oil. It is the intake manifold that receives and mixes fuel and air from separate sources. The fuel/air mixture in the intake manifold is drawn into the combustion chamber where it is ignited by the spark plugs and burned. The combustion chamber is largely sealed off from the crankcase by a set of piston rings that are disposed around an outer diameter of the pistons within the piston cylinder. This keeps the oil in the crankcase rather than allowing it to burn as part of the combustion stroke, as in a two-stroke engine. Unfortunately, the piston rings are unable to completely seal off the piston cylinder. Consequently, crankcase oil intended to lubricate the cylinder is, instead, drawn into the combustion chamber and burned during the combustion process. Additionally, combustion waste gases comprising unburned fuel and exhaust gases in the cylinder simultaneously pass the piston rings and enter the crankcase. The waste gas entering the crankcase is commonly called "blow-by" or "blow-by gas".

Blow-by gases mainly consist of contaminants such as hydrocarbons (unburned fuel), carbon dioxide or water vapor, all of which are harmful to the engine crankcase. The quantity of blow-by gas in the crankcase can be several times that of the concentration of hydrocarbons in the intake manifold. Simply venting these gases to the atmosphere increases air pollution. Although, trapping the blow-by gases in the crankcase allows the contaminants to condense out of air and accumulate therein over time. Condensed contaminants form corrosive acids and sludge in the interior of the crankcase that dilutes the lubricating oil. This decreases the ability of the oil to lubricate the cylinder and crankshaft. Degraded oil that fails to properly lubricate the crankcase components (e.g. the crankshaft and connecting rods) can be a factor in poor engine performance. Inadequate crankcase lubrication contributes to unnecessary wear on the piston rings which simultaneously reduces the quality of the seal between the combustion chamber and the crankcase. As the engine ages, the gaps between the piston rings and cylinder walls increase resulting in larger quantities of blow-by gases entering the crankcase. Too much blow-by gases entering the crankcase can cause power loss and even engine failure. Moreover, condensed water in the blow-by gases can cause engine parts to rust. Hence, crankcase ventilation systems were developed to remedy the existence of blow-by gases in the crankcase. In general, crankcase ventilation systems expel blow-by gases out of a positive crankcase ventilation (PCV) valve and into the intake manifold to be reburned.

PCV valves recirculate (i.e. vent) blow-by gases from the crankcase back into the intake manifold to be burned again with a fresh supply of air/fuel during combustion. This is particularly desirable as the harmful blow-by gases are not simply vented to the atmosphere. A crankcase ventilation system should also be designed to limit, or ideally eliminate, blow-by gas in the crankcase to keep the crankcase as clean as possible. Early PCV valves comprised simple one-way check valves. These PCV valves relied solely on pressure differentials between the crankcase and intake manifold to function correctly. When a piston travels downward during intake, the air pressure in the intake manifold becomes lower than the surrounding ambient atmosphere. This result is commonly called "engine vacuum". The vacuum draws air toward the intake manifold. Accordingly, air is capable of being drawn from the crankcase and into the intake manifold through a PCV valve that provides a conduit therebetween. The PCV valve basically opens a one-way path for blow-by gases to vent from the crankcase back into the intake manifold. In the event the pressure difference changes (i.e. the pressure in the intake manifold becomes relatively higher than the pressure in the crankcase), the PCV valve closes and prevents gases from exiting the intake manifold and entering the crankcase. Hence, the PCV valve is a "positive" crankcase ventilation system, wherein gases are only allowed to flow in one direction—out from the crankcase and into the intake manifold. The one-way check valve is basically an all-or-nothing valve. That is, the valve is completely open during periods when the pressure in the intake manifold is relatively less than the pressure in the crankcase. Alternatively, the valve is completely closed when the pressure in the crankcase is relatively lower than the pressure in the intake manifold. One-way check valve-based PCV valves are unable to account for changes in the quantity of blow-by gases that exist in the crankcase at any given time. The quantity of blow-by gases in the crankcase varies under different driving conditions and by engine make and model.

PCV valve designs have been improved over the basic one-way check valve and can better regulate the quantity of blow-by gases vented from the crankcase to the intake manifold. One PCV valve design uses a spring to position an internal restrictor, such as a cone or disk, relative to a vent through which the blow-by gases flow from the crankcase to the intake manifold. The internal restrictor is positioned proximate to the vent at a distance proportionate to the level of engine vacuum relative to spring tension. The purpose of the spring is to respond to vacuum pressure variations between the crankcase and intake manifold. This design is intended to improve on the all-or-nothing one-way check valve. For example, at idle, engine vacuum is high. The spring-biased restrictor is set to vent a large quantity of blow-by gases in view of the large pressure differential, even though the engine is producing a relatively small quantity of blow-by gases. The spring positions the internal restrictor to substantially allow air flow from the crankcase to the intake manifold. During acceleration, the engine vacuum decreases due to an increase in engine load. Consequently, the spring is able to push the internal restrictor back down to reduce the air flow from the crankcase to the intake manifold, even though the engine is producing more blow-by gases. Vacuum pressure then increases as the acceleration decreases (i.e. engine load decreases) as the vehicle moves toward a constant cruising speed. Again, the spring draws the internal restrictor back away from the vent to a position that substantially allows air flow from the crankcase to the intake manifold. In this situation, it is desirable to increase air flow from the crankcase to the intake manifold, based on the pressure differential, because the engine creates more blow-by gases at cruising speeds due to higher engine RPMs. Hence, such an improved PCV valve that solely relies on engine vacuum and a spring-biased restrictor does not optimize the ventilation of blow-by gases from the crankcase to the intake manifold, especially in situations where the vehicle is constantly changing speeds (e.g. city driving or stop and go highway traffic).

One key aspect of crankcase ventilation is that engine vacuum varies as a function of engine load, rather than engine speed, and the quantity of blow-by gases varies, in part, as a function of engine speed, rather than engine load. For example, engine vacuum is higher when engine speeds remain relatively constant (e.g. idling or driving at a constant velocity). Thus, the amount of engine vacuum present when an engine is idling (at say 900 rotations per minute (rpm)) is essentially the same as the amount of vacuum present when the engine is cruising at a constant speed on a highway (for example between 2,500 to 2,800 rpm). The rate at which blow-by gases are produced is much higher at 2,500 rpm than at 900 rpm. But, a spring-based PCV valve is unable to account for the difference in blow-by gas production between 2,500 rpm and 900 rpm because the spring-based PCV valve experiences a similar pressure differential between the intake manifold and the crankcase at these different engine speeds. The spring is only responsive to changes in air pressure, which is a function of engine load rather than engine speed. Engine load typically increases when accelerating or when climbing a hill, for example. As the vehicle accelerates, blow-by gas production increases, but the engine vacuum decreases due to the increased engine load. Thus, the spring-based PCV valve may vent an inadequate quantity of blow-by gases from the crankcase during acceleration. Such a spring-based PCV valve system is incapable of venting blow-by gases based on blow-by gas production because the spring is only responsive to engine vacuum.

U.S. Pat. No. 5,228,424 to Collins, the contents of which are herein incorporated by reference, is an example of a two-stage spring-based PCV valve that regulates the ventilation of blow-by gases from the crankcase to the intake manifold. Specifically, Collins discloses a PCV valve having two disks therein to regulate air flow between the crankcase and the intake manifold. The first disk has a set of apertures therein and is disposed between a vent and the second disk. The second disk is sized to cover the apertures in the first disk. When little or no vacuum is present, the second disk is held against the first disk, resulting in both disks being held against the vent. The net result is that little air flow is permitted through the PCV valve. Increased engine vacuum pushes the disks against a spring and away from the vent, thereby allowing more blow-by gases to flow from the crankcase, through the PCV valve and back into the intake manifold. The mere presence of engine vacuum causes at least the second disk to move away from and therefore vent blow-by gases from the engine crankcase. The first disk in particular typically substantially covers the vent whenever the throttle position indicates that the engine is operating at a low, constant speed (e.g. idling). Upon vehicle acceleration, the first disk may move away from the vent thereby venting more blow-by gases when the throttle position indicates the engine is accelerating or operating at a constant yet higher speed. The positioning of the first disk is based mostly on throttle position and the positioning of the second disk is based mostly on vacuum pressure between the intake manifold and crankcase. But, blow-by gas production is not based solely on vacuum pressure, throttle position, or a combination. Instead, blow-by gas production is based on a plurality of different factors, including engine load. Hence, the Collin's PCV valve also inadequately vents blow-by gases from the crankcase to the intake manifold when the engine load varies at similar throttle positions.

Maintenance of a PCV valve system is important and relatively simple. The lubricating oil must be changed periodically to remove the harmful contaminants trapped therein over time. Failure to change the lubricating oil at adequate intervals (typically every 3,000 to 6,000 miles) can lead to a PCV valve system contaminated with sludge. A plugged PCV valve system will eventually damage the engine. The PCV valve system should remain clear for the life of the engine assuming the lubricating oil is changed at an adequate frequency.

As part of an effort to combat smog in the Los Angeles basin, California started requiring emission control systems on all model cars starting in the 1960's. The Federal Government extended these emission control regulations nationwide in 1968. Congress passed the Clear Air Act in 1970 and established the Environmental Protection Agency (EPA). Since then, vehicle manufacturers have had to meet a series of graduated emission control standards for the production and maintenance of vehicles. This involved implementing devices to control engine functions and diagnose engine problems. More specifically, automobile manufacturers started integrating electrically controlled components, such as electric fuel feeds and ignition systems. Sensors were also added to measure engine efficiency, system performance and pollution. These sensors were capable of being accessed for early diagnostic assistance.

On-Board Diagnostics (OBD) refers to early vehicle self-diagnostic systems and reporting capabilities. OBD systems provide current state information for various vehicle subsystems. The quantity of diagnostic information available via OBD has varied widely since the introduction of on-board computers to automobiles in the early 1980's. OBD originally illuminated a malfunction indicator light (MIL) for a detected problem, but did not provide information regarding the nature of the problem. Modern OBD implementations use a standardized fast digital communications port to provide real-time data in combination with standardized series of diagnostic trouble codes (DTCs) to establish rapid identification of malfunctions and the corresponding remedy from within the vehicle.

The California Air Resources Board (CARB or simply ARB) developed regulations to enforce the application of the first incarnation of OBD (known now as "OBD-I"). The aim of CARB was to encourage automobile manufacturers to design reliable emission control systems. CARB envisioned lowering vehicle emissions in California by denying registration of vehicles that did not pass the CARB vehicle emission standards. Unfortunately, OBD-I did not succeed at the time as the infrastructure for testing and reporting emissions-specific diagnostic information was not standardized or widely accepted. Technical difficulties in obtaining standardized and reliable emission information from all vehicles led to an inability to effectively implement an annual testing program.

OBD became more sophisticated after the initial implementation of OBD-I. OBD-II was a new standard introduced in the mid 1990's that implemented a new set of standards and practices developed by the Society of Automotive Engineers (SAE). These standards were eventually adopted by the EPA and CARB. OBD-II incorporates enhanced features that provide better engine monitoring technologies. OBD-II also monitors chassis parts, body and accessory devices, and includes an automobile diagnostic control network. OBD-II improved upon OBD-I in both capability and standardization. OBD-II specifies the type of diagnostic connector, pin configuration, electrical signaling protocols, messaging format and provides an extensible list of DTCs. OBD-II also monitors a specific list of vehicle parameters and encodes performance data for each of those parameters. Thus, a single device can query the on-board computer(s) in any vehicle. This simplification of reporting diagnostic data led to the feasibility of the comprehensive emissions testing program envisioned by CARB.

Thus, there exists a significant need for an improved PCV valve system that optimally regulates the flow of engine blow-by gases from the crankcase to the intake manifold. Such a pollution control device should include an electrically controllable PCV valve capable of regulating air flow from the crankcase to the intake manifold, a controller electrically coupled to the PCV valve for regulating the PCV valve, and a set of sensors for measuring engine performance such as engine speed and engine load. Such a pollution control device should decrease the rate of fuel consumption, should decrease the rate of harmful pollutant emissions, and should increase engine performance. The present invention fulfills these needs and provides further related advantages.

SUMMARY OF THE INVENTION

The pollution control system disclosed herein includes a controller coupled to a sensor monitoring an operational characteristic of a combustion engine. The sensor may include an engine temperature sensor, a spark plug sensor, an accelerometer sensor, a PCV valve sensor or an exhaust sensor. In one embodiment, the controller monitors engine combustion rate via the engine temperature sensor to gauge the quantity of blow-by gas product. The controller may include a wireless transmitter or a wireless receiver for sending and/or receiving data associated with the information collected by the sensors. In this regard, the controller may include a pre-programmed software program, a flash-updatable software program, or a behavior-learning software program. In a preferred embodiment, the software program operating the controller is accessible wirelessly through the transmitter and/or the receiver. Information such as customized operating conditions developed by the behavior-learning software program may be retrieved from the controller and subsequently used to more efficiently operate the pollution control system.

The pollution control system further includes a PCV valve having an inlet and an outlet adapted to vent blow-by gas out from a combustion engine. Preferably, the PCV valve is a two-stage check valve. A fluid regulator associated with the PCV valve and responsive to the controller is used in the pollution control system to selectively modulate engine vacuum pressure to adjustably increase or decrease the fluid flow rate of blow-by gas venting from the combustion engine. The controller adjustably positions the fluid regulator to vary the degree of engine vacuum based, in part, on measurements taken from one or more of the aforementioned sensors. In a preferred embodiment, the PCV valve inlet connects to a crankcase and the PCV valve outlet connects to an intake manifold of an internal combustion engine. The controller decreases the engine vacuum pressure during periods of decreased blow-by gas production in the internal combustion engine, thereby decreasing the fluid flow rate through the PCV valve, and increases the engine vacuum pressure during periods of increased blow-by gas production in the internal combustion engine, thereby increasing the fluid flow rate through the PCV valve.

The controller may activate and/or deactivate the fluid regulator under any one of a plurality of different conditions. For instance, the controller activates and/or deactivates the fluid regulator at an engine frequency (e.g. a resonant frequency) or a set of engine frequencies. Alternatively, the controller may further couple to an engine RPM sensor having a window switch. The fluid regulator is selectively positionable based on a predetermined engine RPM or multiple engine RPMs set by the window switch. In another alternative embodiment, the controller may include an on-delay timer that sets the fluid regulator to preclude fluid flow for a predetermined duration after activation of the combustion engine. The predetermined duration the fluid regulator precludes fluid flow may be a function of time, engine temperature or engine RPM.

In another alternative embodiment, the pollution control system may further include a supplemental fuel fluidly coupled to the PCV valve and to the air flow regulator. A one-way check valve electronically coupled to the controller selectively modulates release of the supplemental fuel to the PCV valve and the fluid regulator. The supplemental fuel may include a compressed natural gas (CNG) or a hydrogen gas. Preferably, the hydrogen gas is made on-demand by a hydrogen generator coupled to and regulated by the controller. The controller increases hydrogen gas production with increased vacuum pressure and the corresponding increase in fluid flow rate, and decreases hydrogen gas production with decreased vacuum pressure and the corresponding decrease in fluid flow rate. Modulation of the vacuum pressure and the fluid flow rate may be based on measurements from combustion engine operational characteristics that might include engine temperature, a quantity of engine cylinders, a real-time acceleration calculation, or engine RPM.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 7 is a cross-sectional view of the PCV valve, illustrating no air flow;

FIG. 8 is a cross-sectional view of the PCV valve, illustrating restricted air flow.

DETAILED DESCRIPTION OF THE PREFERRED EMBODIMENTS

Figure 1:
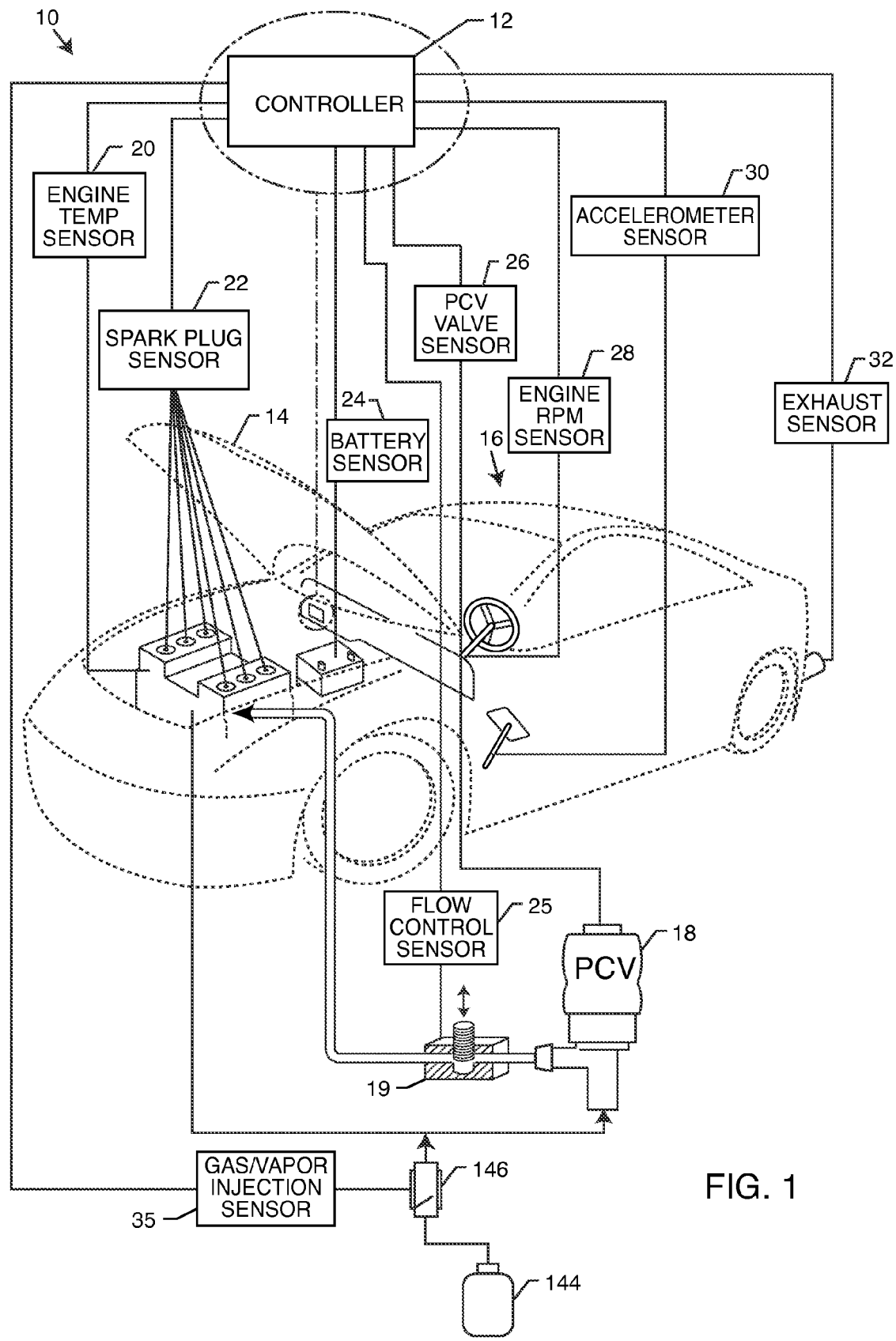
FIG. 1 is a schematic illustrating a controller operationally coupled to numerous sensors and a PCV valve.

As shown in the drawings for purposes of illustration, the present invention for a pollution control system is referred to generally by the reference number 10. In FIG. 1, the pollution control system 10 is generally illustrated as having a controller 12 preferably mounted under a hood 14 of an automobile 16. The controller 12 is electrically coupled to any one of a plurality of sensors that monitor and measure the real-time operating conditions and performance of the automobile 16. The controller 12 regulates the flow rate of blow-by gases by regulating the engine vacuum in a combustion engine through digital control of a PCV valve 18 and a flow control orifice 19. The controller 12 receives real-time input from sensors that might include an engine temperature sensor 20, a spark plug sensor 22, a battery sensor 24, a flow control sensor 25, a PCV valve sensor 26, an engine RPM sensor 28, an accelerometer sensor 30, an exhaust sensor 32, and a gas/vapor injection sensor 33. Data obtained from the sensors 20, 22, 24, 25, 26, 28, 30, 32, 33 by the controller 12 is used to regulate the PCV valve 18 and the flow control orifice 19, as described in more detail below.

Figure 2:
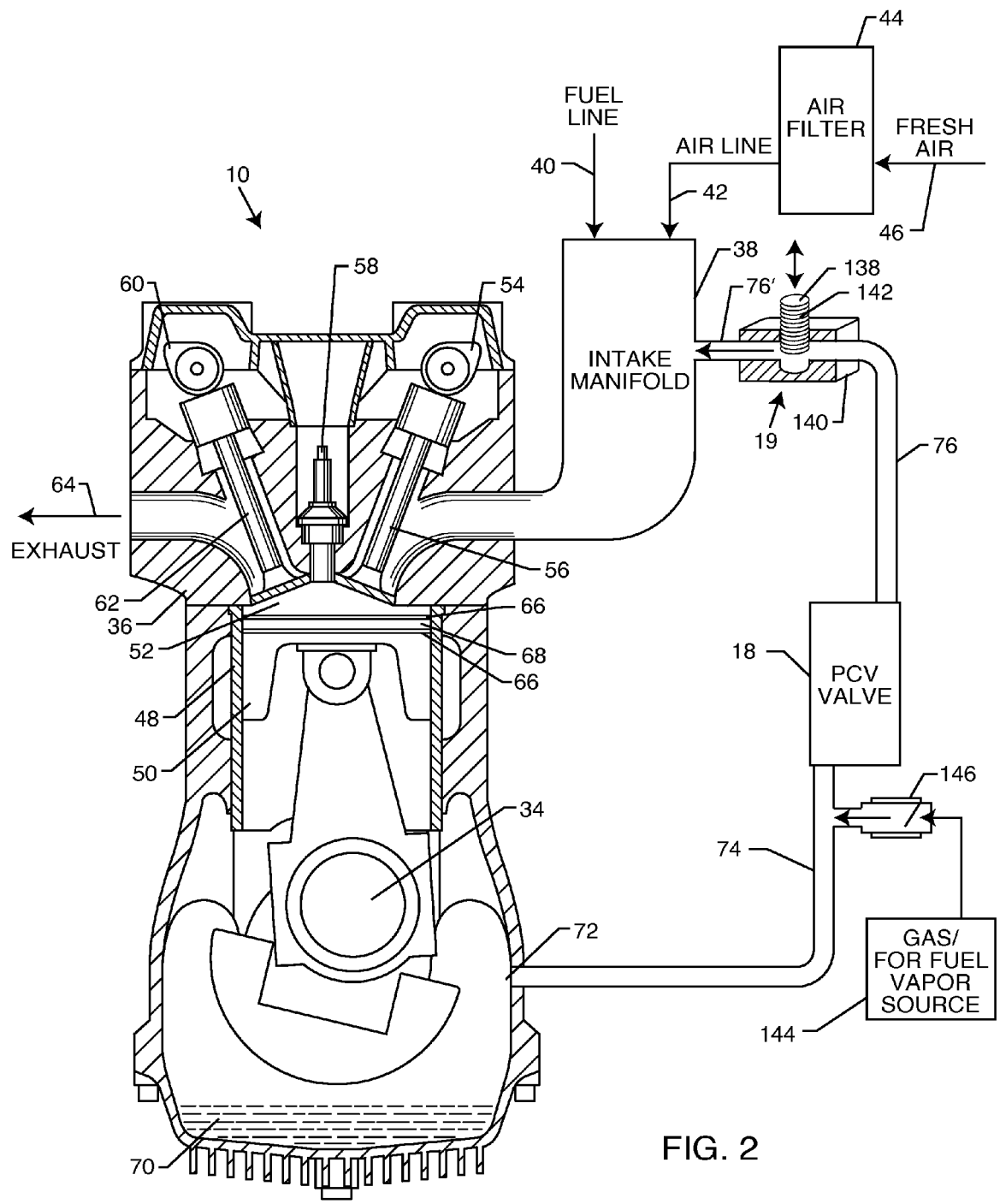
FIG. 2 is a schematic illustrating the general functionality of the PCV valve with a combustion-based engine.

FIG. 2 is a schematic illustrating operation of the PCV valve 18 and the flow control orifice 19 within the pollution control system 10. As shown in FIG. 2, the PCV valve 18 is disposed between a crankcase 34, of an engine 36, and an intake manifold 38. In operation, the intake manifold 38 receives a mixture of fuel and air via a fuel line 40 and an air line 42, respectively. An air filter 44 may be disposed between the air line 42 and an air intake line 46 to filter fresh air entering the pollution control system 10, before mixing with fuel in the intake manifold 38. The air/fuel mixture in the intake manifold 38 is delivered to a piston cylinder 48 as a piston 50 descends downward within the cylinder 48 from the top dead center. This creates a vacuum within a combustion chamber 52. Accordingly, an input camshaft 54 rotating at half the speed of the crankshaft 34 is designed to open an input valve 56 thereby subjecting the intake manifold 38 to the engine vacuum. Thus, fuel/air is drawn into the combustion chamber 52 from the intake manifold 38.

The fuel/air in the combustion chamber 52 is ignited by a spark plug 58. The rapid expansion of the ignited fuel/air in the combustion chamber 52 causes depression of the piston 50 within the cylinder 48. After combustion, an exhaust camshaft 60 opens an exhaust valve 62 to allow escape of the combustion gases from the combustion chamber 52 out an exhaust line 64. Typically, during the combustion cycle, excess exhaust gases slip by a pair of piston rings 66 mounted in a head 68 of the piston 50. These "blow-by gases" enter the crankcase 34 as high pressure and temperature gases. Over time, harmful exhaust gases such as hydrocarbons, carbon monoxide, nitrous oxide and carbon dioxide can condense out from a gaseous state and coat the interior of the crankcase 34 and mix with the oil 70 that lubricates the mechanics within the crankcase 34. But, the pollution control system 10 is designed to vent these blow-by gases from the crankcase 34 to the intake manifold 38 to be recycled as fuel for the engine 36. This is accomplished by using the pressure differential between the crankcase 34 and intake manifold 38. In operation, the blow-by gases exit the relatively higher pressure crankcase 34 through a vent 72 and travel through a vent line 74, the PCV valve 18, a return line 76, the flow control orifice 19, and finally through an auxiliary return line 76' and into the relatively lower pressure intake manifold 38 coupled thereto. Accordingly, the quantity of blow-by gases vented from the crankcase 34 to the intake manifold 38 via the PCV valve 18 and the flow control orifice 19 is digitally regulated by the controller 12 shown in FIG. 1.

Figure 3:
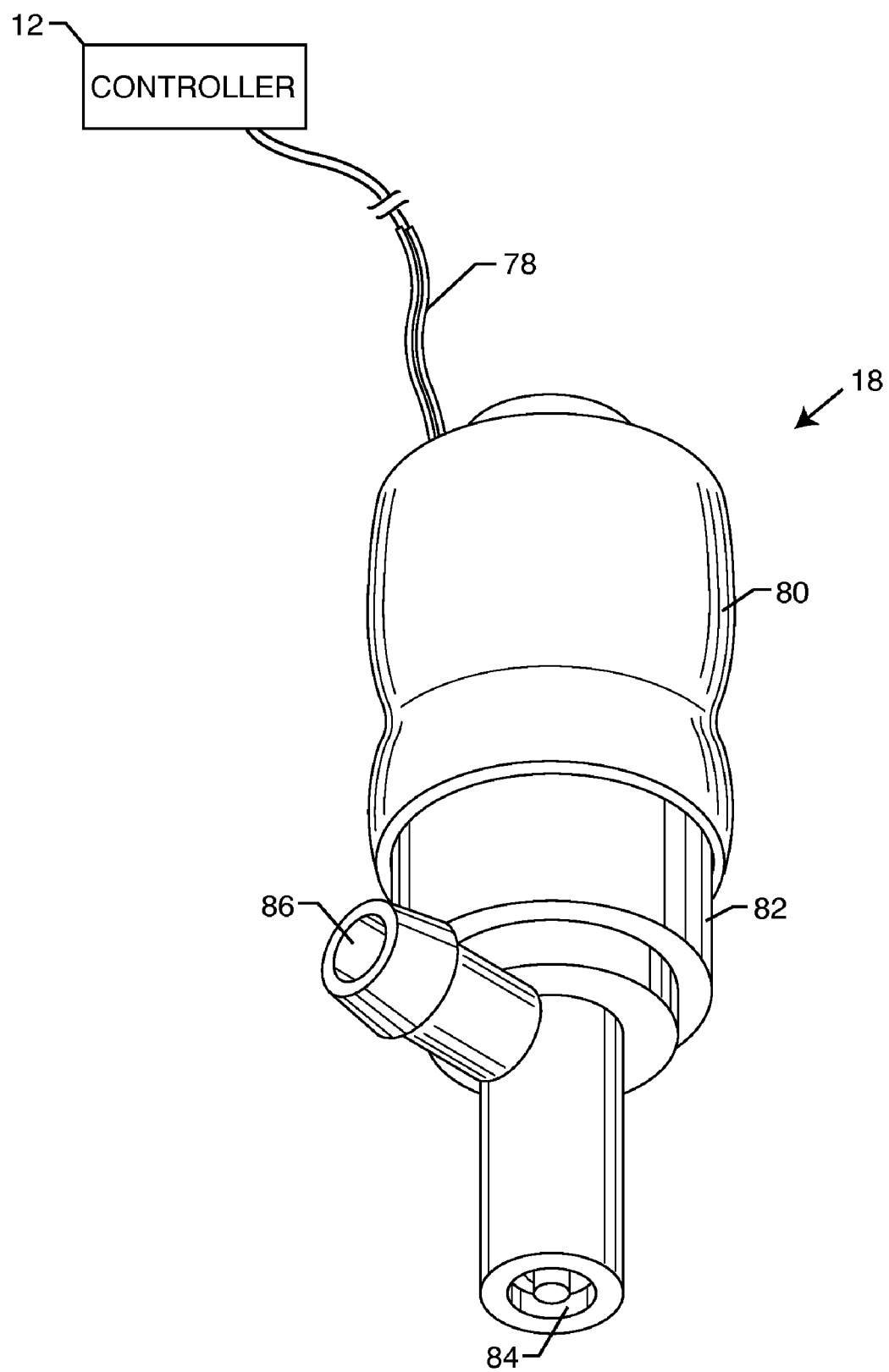
FIG. 3 is a perspective view of a PCV valve for use with the pollution control system.

The PCV valve 18 in FIG. 3 is generally electrically coupled to the controller 12 via a pair of electrical connections 78. The controller 12 at least partly regulates the quantity of blow-by gases flowing through the PCV valve 18 via the electrical connections 78. In FIG. 3, the PCV valve 18 includes a rubber housing 80 that encompasses a portion of a rigid outer housing 82. The connector wires 78 extend out from the outer housing 82 via an aperture therein (not shown). Preferably, the outer housing 82 is unitary and comprises an intake orifice 84 and an exhaust orifice 86. In general, the controller 12 operates a restrictor internal to the outer housing 82 for regulating the rate of blow-by gases entering the intake orifice 84 and exiting the exhaust orifice 86.

Figure 4:
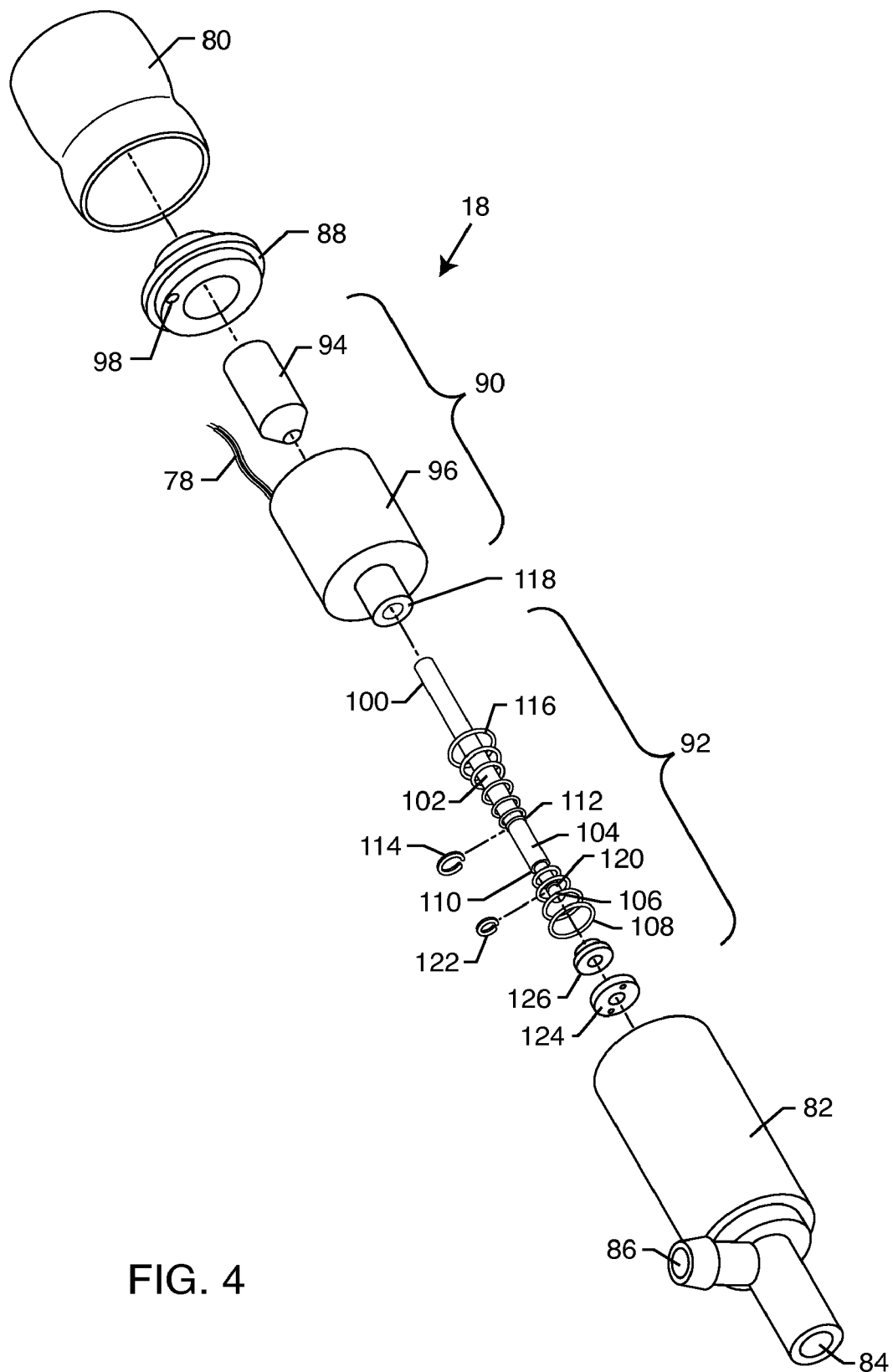
FIG. 4 is an exploded perspective view of the PCV valve of FIG. 3.

FIG. 4 illustrates the PCV valve 18 in an exploded perspective view. The rubber housing 80 covers an end cap 88 that substantially seals to the outer housing 82 thereby encasing a solenoid mechanism 90 and an air flow restrictor 92. The solenoid mechanism 90 includes a plunger 94 disposed within a solenoid 96. The connector wires 78 operate the solenoid 96 and extend through the end cap 88 through an aperture 98 therein. Similarly, the rubber housing 80 includes an aperture (not shown) to allow the connector wires 78 to be electrically coupled to the controller 12 (FIG. 2).

In general, engine vacuum present in the intake manifold 38 (FIG. 2) causes blow-by gases to be drawn from the crankcase 34, through the intake orifice 84 and out the exhaust orifice 86 in the PCV valve 18 (FIG. 4). The air flow restrictor 92 shown in FIG. 4 is one mechanism that regulates the quantity of blow-by gases that vent from the crankcase 34 to the intake manifold 38. Regulating blow-by gas air flow rate is particularly advantageous as the pollution control system 10 is capable of increasing the rate blow-by gases vent from the crankcase 34 during times of higher blow-by gas production and decreasing the rate blow-by gases vent from the crankcase 34 during times of lower blow-by gas production, as described in more detail below. The controller 12 is coupled to the plurality of sensors 20, 22, 24, 25, 26, 28, 30, 32, 33 to monitor the overall efficiency and operation of the automobile 16 and operates the PCV valve 18 in real-time to maximize recycling of blow-by gases according to the measurements taken by the sensors 20, 22, 24, 25, 26, 28, 30, 32, 33.

The operational characteristics and production of blow-by is unique for each engine and each automobile in which individual engines are installed. The pollution control system 10 is capable of being installed in the factory or post production to maximize automobile fuel efficiency, reduce harmful exhaust emissions, recycle oil and other gas and eliminate contaminants within the crankcase. The purpose of the pollution control system 10 is to strategically vent the blow-by gases from the crankcase 34 into the intake manifold 38 based on blow-by gas production. Accordingly, the controller 12 digitally regulates and controls the PCV valve 18 and the flow control orifice 19 based on engine speed and other operating characteristics and real-time measurements taken by the sensors 20, 22, 24, 25, 26, 28, 30, 32, 33. Importantly, the pollution control system 10 is adaptable to any internal combustion engine. For example, the pollution control system 10 may be used with gasoline, methanol, diesel, ethanol, compressed natural gas (CNG), liquid propane gas (LPG), hydrogen, alcohol-based engines, or virtually any other combustible gas and/or vapor-based engine. This includes both two and four stroke IC engines and all light, medium and heavy duty configurations. The pollution control system 10 may also be integrated into immobile engines used to produce energy or used for industrial purposes.

In particular, venting blow-by gases based on engine speed and other operating characteristics of an automobile decreases the quantity of hydrocarbons, carbon monoxide, nitrogen oxide and carbon dioxide emissions. The pollution control system 10 recycles these gases by burning them in the combustion cycle. No longer are large quantities of the contaminants expelled from the vehicle via the exhaust. Hence, the pollution control system 10 is capable of reducing air pollution by forty to fifty percent for each automobile, increasing gas mileage per gallon by twenty to thirty percent, increasing horsepower performance by twenty to thirty percent, reducing automobile engine wear by thirty to fifty percent (due to low carbon retention therein) and reducing the number of oil changes from approximately every 5,000 miles to approximately every 50,000 miles. Considering that the United States consumes approximately 870 million gallons of petroleum a day, a fifteen percent reduction through the recycling of blow-by gases with the pollution control system 10 translates into a savings of approximately 130 million gallons of petroleum a day in the United States alone. Worldwide, nearly 3.3 billion gallons of petroleum are consumed per day, which would result in approximately 500 billion gallons of petroleum saved every day.

In one embodiment, the quantity of blow-by gases entering the intake orifice 84 of the PCV valve 18 is regulated by the air flow restrictor 92 as generally shown in FIG. 4. The air flow restrictor 92 includes a rod 100 having a rear portion 102, an intermediate portion 104 and a front portion 106. The front portion 106 has a diameter slightly less than the rear portion 102 and the intermediate portion 104. A front spring 108 is disposed concentrically over the intermediate portion 104 and the front portion 106, including over a front surface 110 of the rod 100. The front spring 108 is preferably a coil spring that decreases in diameter from the intake orifice 84 toward the front surface 110. An indented collar 112 separates the rear portion 102 from the intermediate portion 104 and provides a point where a rear snap ring 114 may attach to the rod 100. The diameter of the front spring 108 should be approximately or slightly less than the diameter of the rear snap ring 114. The rear snap ring 114 engages the front spring 108 on one side and a rear spring 116 on the other side. Like the front spring 108, the rear spring 116 tapers from a wider diameter near the solenoid 96 to a diameter approximately the size of or slightly smaller than the diameter of the rear snap ring 114. The rear spring 116 is preferably a coil spring and is wedged between a front surface 118 of the solenoid 96 and the rear snap ring 114. The front portion 106 also includes an indented collar 120 providing a point of attachment for a front snap ring 122. The diameter of the front snap ring 122 is smaller than that of the tapered front spring 108. The front snap ring 122 fixedly retains a front disk 124 on the front portion 106 of the rod 100. Accordingly, the front disk 124 is fixedly wedged between the front snap ring 122 and the front surface 110. The front disk 124 has an inner diameter configured to slidably engage the front portion 106 of the rod 100. The front spring 108 is sized to engage a rear disk 126 as described below.

Figures 5, 6:
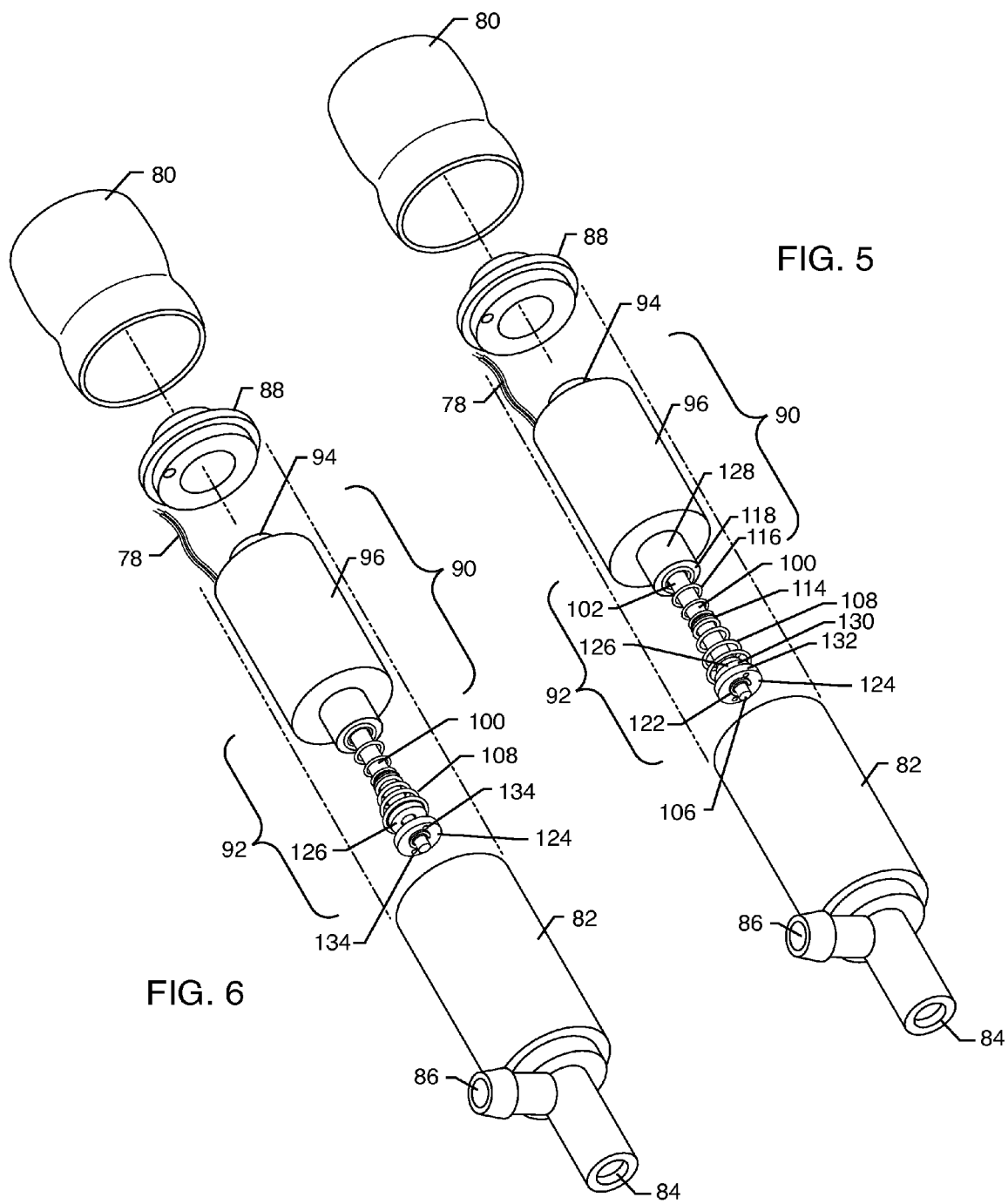
FIG. 5 is a partially exploded perspective view of the PCV valve, illustrating assembly of an air flow restrictor.
FIG. 6 is a partially exploded perspective view of the PCV valve, illustrating partial depression of the air flow restrictor.

The disks 124, 126 govern the quantity of blow-by gases entering the intake orifice 84 and exiting the exhaust orifice 86. FIGS. 5 and 6 illustrate the air flow restrictor 92 assembled to the solenoid mechanism 90 and external to the rubber housing 80 and the outer housing 82. Accordingly, the plunger 94 fits within a rear portion of the solenoid 96 as shown therein. The connector wires 78 are coupled to the solenoid 96 and govern the position of the plunger 94 within the solenoid 96 by regulating the current delivered to the solenoid 96. Increasing or decreasing the electrical current through the solenoid 96 correspondingly increases or decreases the magnetic field produced therein. The magnetized plunger 94 responds to the change in magnetic field by sliding into or out from within the solenoid 96. Increasing the electrical current delivered to the solenoid 96 through the connector wires 78 increases the magnetic field in the solenoid 96 and causes the magnetized plunger 94 to depress further within the solenoid 96. Conversely, reducing the electrical current supplied to the solenoid 96 via the connector wires 78 reduces the magnetic field therein and causes the magnetized plunger 94 to slide out from within the interior of the solenoid 96. As will be shown in more detail herein, the positioning of the plunger 94 within the solenoid 96 at least partially determines the quantity of blow-by gases that may enter the intake orifice 84 at any given time. This is accomplished by the interaction of the plunger 94 with the rod 100 and the corresponding front disk 124 secured thereto.

FIG. 5 specifically illustrates the air flow restrictor 92 in a closed position. The rear portion 102 of the rod 100 has an outer diameter approximately the size of the inner diameter of an extension 128 of the solenoid 96. Accordingly, the rod 100 can slide within the extension 128 and the solenoid 96. The position of the rod 100 in the outer housing 82 depends upon the positioning of the plunger 94 due to the engagement of the rear portion 106 with the plunger 94 as shown more specifically in FIGS. 7-9. As shown in FIG. 5, the rear spring 116 is compressed between the front surface 118 of the extension 128 and the rear snap ring 114. Similarly, the front spring 108 is compressed between the rear snap spring 114 and the rear disk 126. As better shown in FIGS. 7-9, the front disk 124 includes an extension 130 having a diameter less than that of a foot 132. The foot 132 of the rear disk 126 is approximately the diameter of the tapered front spring 108. In this manner, the front spring 108 fits over an extension 130 of the rear disk 126 to engage the planar surface of the diametrically larger foot 132 thereof. The inside diameter of the rear disk 126 is approximately the size of the external diameter of the intermediate portion 104 of the rod 100. This allows the rear disk 126 to slide thereon. The front disk 124 has an inner diameter approximately the size of the outer diameter of the front portion 106 of the rod 100, which is smaller in diameter than either the intermediate portion 104 or the rear portion 102. In this regard, the front disk 124 locks in place on the front portion 106 of the rod 100 between the front surface 110 and the front snap ring 122. Accordingly, the position of the front disk 124 is dependent upon the position of the rod 100 as coupled to the plunger 94. The plunger 94 slides into or out from within the solenoid 96 depending on the amount of current delivered by the connecting wires 78, as described above.

FIG. 6 illustrates the PCV valve 18 wherein increased vacuum created between the crankcase 34 and the intake manifold 38 causes the rear disk 126 to retract away from the intake orifice 84 thereby allowing air to flow therethrough. In this situation the engine vacuum pressure exerted upon the disk 126 must overcome the opposite force exerted by the front spring 108. Here, small quantities of blow-by gases may pass through the PCV valve 18 through a pair of apertures 134 in the front disk 124.

Figure 9:
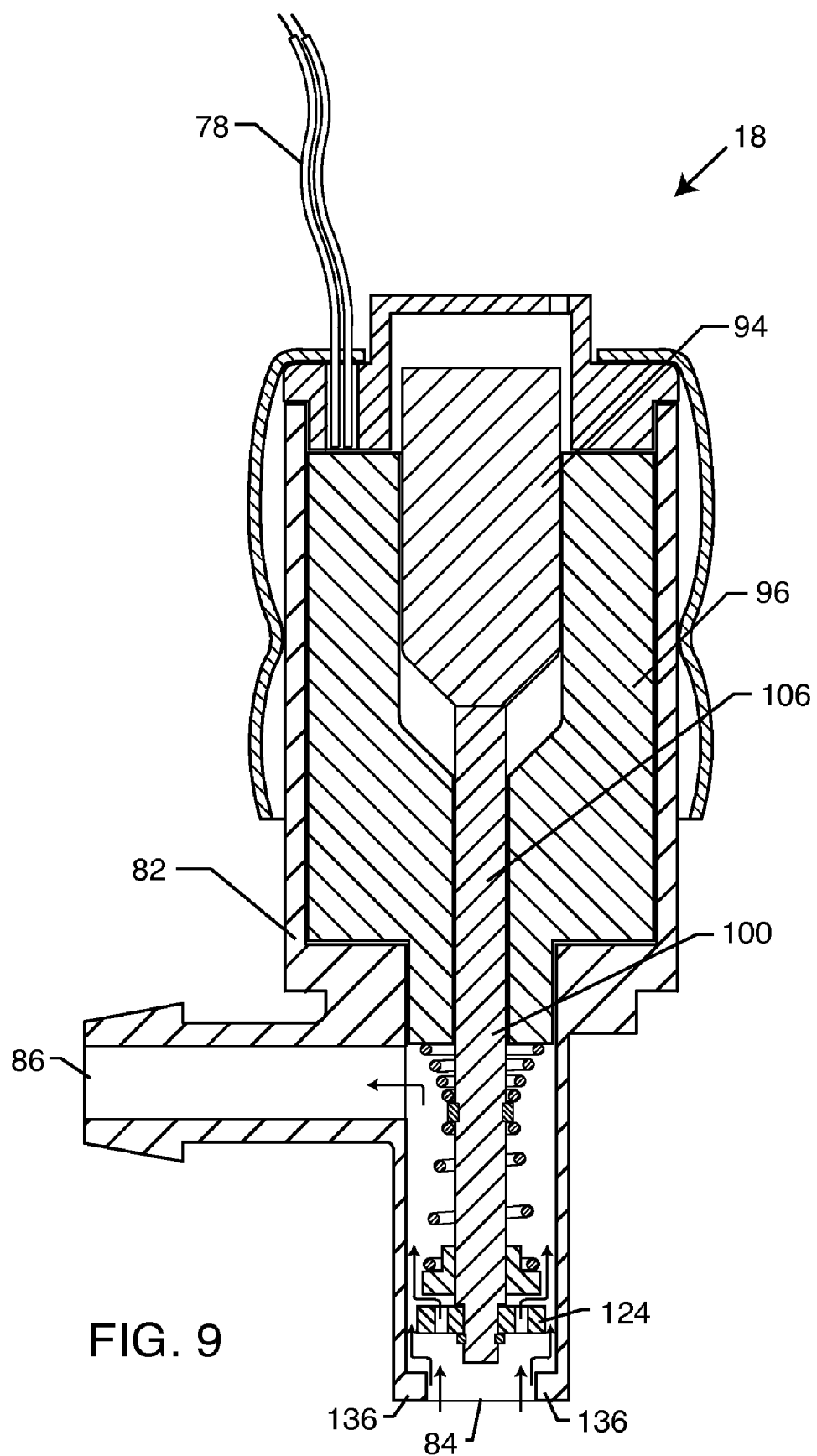
FIG. 9 is another cross-sectional view of the PCV valve, illustrating full air flow.

FIGS. 7-9 more specifically illustrate the functionality of the PCV valve 18 in accordance with the pollution control system 10. FIG. 7 illustrates the PCV valve 18 in a closed position. Here, no blow-by gas may enter the intake orifice 84. As shown, the front disk 124 is flush against a flange 136 defined in the intake orifice 84. The diameter of the foot 132 of the rear disk 126 extends over and encompasses the apertures 134 in the front disk 124 to prevent any air flow through the intake orifice 84. In this position, the plunger 94 is disposed within the solenoid 96 thereby pressing rod 100 toward the intake orifice 84. The rear spring 116 is thereby compressed between the front surface 118 of the solenoid 96 and the rear snap ring 114. Likewise, the front spring 108 compresses between the rear snap ring 114 and the foot 132 of the rear disk 126.

FIG. 8 is an embodiment illustrating a condition wherein the vacuum pressure exerted by the intake manifold relative to the crankcase is greater than the pressure exerted by the front spring 108 to position the rear disk 126 flush against the front disk 124. In this case, the rear disk 126 is able to slide along the outer diameter of the rod 100 thereby opening the apertures 134 in the front disk 124. Limited quantities of blow-by gases are allowed to enter the PCV valve 18 through the intake orifice 84 as noted by the directional arrows therein. Of course, the blow-by gases exit the PCV valve 18 through the exhaust orifice 86. In the position shown in FIG. 8, blow-by gas air flow is still restricted as the front disk 124 remains seated against the flanges 136. Thus, only limited air flow is possible through the apertures 134. Increasing the engine vacuum consequently increases the air pressure exerted against the rear disk 126. Accordingly, the front spring 108 is further compressed such that the rear disk 126 continues to move away from the front disk 124 thereby creating a larger air flow path to allow escape of the additional blow-by gases. Moreover, the plunger 94 in the solenoid 96 may position the rod 100 within the PCV valve 18 to exert more or less pressure on the springs 108, 116 to restrict or permit air flow through the intake orifice 84, as determined by the controller 12.

FIG. 9 illustrates another condition wherein additional air flow is permitted to flow through the intake orifice 84 by retracting the plunger 94 out from within the solenoid 96 by altering the electric current through the connector wires 78. Reducing the electrical current flowing through the solenoid 96 reduces the corresponding magnetic field generated therein and allows the magnetic plunger 94 to retract. Accordingly, the rod 100 retracts away from the intake orifice 84 with the plunger 94. This allows the front disk 124 to unseat from the flanges 136 thereby allowing additional air flow to enter the intake orifice 84 around the outer diameter of the front disk 124. Of course, the increase in air flow through the intake orifice 84 and out through the exhaust orifice 86 allows increased venting of blow-by gases from the crankcase to the intake manifold. In one embodiment, the plunger 94 allows the rod 100 to retract all the way out from within the outer housing 82 such that the front disk 124 and the rear disk 126 no longer restrict air flow through the intake orifice 84 and out through the exhaust orifice 86. This is particularly desirable at high engine RPMs and high engine loads, where increased amounts of blow-by gases are produced by the engine. Of course, the springs 108, 116 may be rated differently according to the specific automobile with which the PCV valve 18 is to be incorporated in a pollution control system 10.

In another aspect of the pollution control system 10, the flow control orifice 19, as shown in FIG. 2, is disposed between the PCV valve 18 and the intake manifold 38. The flow control orifice 19 regulates the quantity of air flow through the return line 76 during engine operation and may be used with any of the embodiments described herein. Specifically, a set screw 138 resides in a line block 140 disposed between the PCV valve 18 and the intake manifold 38. The set screw 138 and the line block 140 are designed to regulate the vacuum pressure between the crankcase 34 and the intake manifold 38. Increasing and/or decreasing the vacuum pressure with the flow control orifice 19 affects the rate blow-by gases vent from the crankcase 34 to the intake manifold 38. For example, blow-by gases exiting the PCV valve 18 through the exhaust orifice 86 enter into the return line 76. The return line 76 is pressure sealed to the line block 140. As shown by the directional arrow in FIG. 2, the set screw 138 may screw into or out from the line block 140. The set screw 138 is used in this manner to regulate air flow through the line block 140. The purpose of the set screw 138 is to function as an air flow restrictor between the return line 76 and the auxiliary return line 76'. Inserting the set screw 138 into the line block 140 restricts air flow between the return line 76 and the auxiliary return line 76'. Accordingly, the set screw 138 builds up back pressure in the return line 76 that counters the engine vacuum. Thus, the quantity of blow-by gases vented from the crankcase 34 into the vent line 74 and into the PCV valve 18 decreases. When the pollution control system 10 endeavors to increase the quantity of blow-by gases vented from the crankcase 34 into the intake manifold 38, the controller 12 retracts the set screw 138 out from within the line block 140 to decrease the back pressure on the engine vacuum. This allows the passage of more blow-by gases from the return line 76 to the auxiliary return line 76'. The set screw 138 is digitally electrically controllable by the controller 12 and the positioning of the set screw 138 may be dependent on measurements taken by the controller 12 via any one of the sensors 20, 22, 24, 25, 26, 28, 30, 32, 33 or any other data received or calculated by the controller 12.

The set screw 138 includes a plurality of threads 142 that engage a similar set of threads (not shown) in the line block 140. An electronic system coupled to the set screw 138 may screw or unscrew the set screw 138 within the line block 140 according to the instructions provided by the controller 12. A person of ordinary skill in the art will readily recognize that there may be many mechanical and/or electrical mechanisms known in the art capable of regulating the air flow between the return line 76 and the auxiliary return line 76' in the same manner as the set screw 138 coupled to the line block 140. In general, any mechanism capable of regulating air flow between the intake manifold 38 and the crankcase 34 comparable to the flow control orifice 19 is capable of being substituted for the set screw 138 and the line block 140.

As described above with respect to FIGS. 1-2, the controller 12 governs the air flow rate between the return line 76 and the auxiliary return line 76' with the set screw 138 and governs the air flow rate through the PCV valve 18 with the plunger 94. These features work together to govern the vacuum pressure within the pollution control system 10 and consequently govern the rate of air flow between the crankcase 34 and the intake manifold 38. The controller 12 may include one of or more electronic circuits such as switches, timers, interval timers, timers with relay or other vehicle control modules known in the art. The controller 12 operates the PCV valve 18 and/or the flow control orifice 19 in response to the operation of one or more of these control modules. For example, the controller 12 could include an RWS window switch module provided by Baker Electronix of Beckley, W. Va. The RWS module is an electric switch that activates above a pre-selected engine RPM and deactivates above a higher pre-selected engine RPM. The RWS module is considered a "window switch" because the output is activated during a window of RPMs. The RWS module could work, for example, in conjunction with the engine RPM sensor 28 to modulate the air flow rate of blow-by gases vented from the crankcase 34.

Preferably, the RWS module works with a standard coil signal used by most tachometers when setting the position of the set screw 138 in the flow control orifice 19 or setting the position of the plunger 94 within the solenoid 96. An automobile tachometer is a device that measures real-time engine RPMs. In one embodiment, the RWS module may activate the flow control orifice 19 to position the set screw 138 to block air flow from the return line 76 to the auxiliary return line 76'. Here, the PCV valve 18 does not vent any blow-by gas from the crankcase 34 to the intake manifold 38. In another embodiment, the RWS module may activate the plunger 94 within the solenoid 96 at low engine RPMs, when blow-by gas production is minimal. Here, the plunger 94 pushes the rod 100 toward the intake orifice 84 such that the front disk 124 seats against the flanges 136 as generally shown in FIG. 7. In this regard, the PCV valve 18 vents small amounts of blow-by gases from the crankcase to the intake manifold via the apertures 134 in the front disk 124 even though engine vacuum is high. The high engine vacuum forces blow-by gases through the apertures 134 thereby forcing the rear disk 126 away from the front disk 124, compressing the front spring 108. At idle, the RWS module activates the solenoid 96 to prevent the front disk 124 from unseating from the flanges 136, thereby preventing large quantities of air from flowing between the engine crankcase and the intake manifold. This is particularly desirable at low RPMs as the quantity of blow-by gas produced within the engine is relatively low even though the engine vacuum is relatively high. Obviously, the controller 12 can regulate the PCV valve 18 and the flow control orifice 19 simultaneously to achieve the desired vacuum pressure in the pollution control system 10 to set the air flow rate of blow-by gases vented from the crankcase 34.

Blow-by gas production increases during acceleration, during increased engine load and with higher engine RPMs. Accordingly, the RWS module may activate the flow control orifice 19 to partially or completely remove the set screw 138 out from within the line block 140. This effectively increases the air flow rate from the crankcase 34 to the intake manifold 38 due to the higher engine vacuum therein. Moreover, the RWS module may turn off or reduce the electric current going to the solenoid 96 such that the plunger 94 retracts out from within the solenoid 96 thereby unseating the front disk 124 from the flanges 136 (FIG. 9) and allowing greater quantities of blow-by gas to vent from the crankcase 34 to the intake manifold 38. These functionalities may occur at a selected RPM or within a given range of selected RPMs pre-programmed into the RWS module. The RWS module may reactivate when the automobile eclipses another pre-selected RPM, such as a higher RPM, thereby re-inserting the set screw 138 within the line block 140 or re-engaging the plunger 94 within the solenoid 96.

In an alternative embodiment, a variation of the RWS module may be used to selectively step the set screw 138 out from or into the line block 140 depending on the desired air flow rate from the crankcase 34 to the intake manifold 38. In this embodiment, the set screw 138 may be disposed twenty-five percent, fifty percent or seventy-five percent within the line block 140 to selectively partially obstruct air flow between the return line 76 and the auxiliary return line 76'. Alternatively, the RWS module may be used to selectively step the plunger 94 out from within the solenoid 96. For example, the current delivered to the solenoid 96 may initially cause the plunger 94 to engage the front disk 124 with the flanges 136 of the intake orifice 84 at 900 rpm. At 1700 rpm the RWS module may activate a first stage wherein the current delivered to the solenoid 96 is reduced by one-half. In this case, the plunger 94 retracts halfway out from within the solenoid 96 thereby partially opening the intake orifice 84 to blow-by gas flow. When the engine RPMs reach 2,500, for example, the RWS module may eliminate the current going to the solenoid 96 such that the plunger 94 retracts completely out from within the solenoid 96 to fully open the intake orifice 84. In this position, it is particularly preferred that the front disk 124 and the rear disk 126 no longer restrict air flow between the intake orifice 84 and the exhaust orifice 86. The stages may be regulated by engine RPM or other parameters and calculations made by the controller 12 and based on readings from the sensors 20, 22, 24, 25, 26, 28, 30, 32, 33.

The controller 12 can be pre-programmed, programmed after installation or otherwise updated or flashed to meet specific automobile or on-board diagnostics (OBD) specifications. In one embodiment, the controller 12 is equipped with self-learning software such that the switch (in the case of the RWS module) adapts to optimally position the set screw 138 within the line block 140 and also adapts to the best time to activate or deactivate the solenoid 96, or step the location of the plunger 94 in the solenoid 96, to optimally increase fuel efficiency and reduce air pollution. In a particularly preferred embodiment, the controller 12 optimizes the venting of blow-by gases based on real-time measurements taken by the sensors 20, 22, 24, 25, 26, 28, 30, 32, 33. For example, the controller 12 may determine that the automobile 16 is expelling increased amounts of harmful exhaust via feedback from the exhaust sensor 32. In this case, the controller 12 may remove the set screw 138 from the line block 140 or activate withdrawal of the plunger 94 from within the solenoid 96 to vent additional blow-by gases from within the crankcase to reduce the quantity of pollutants expelled through the exhaust of the automobile 16 as measured by the exhaust sensor 32.

In another embodiment, the controller 12 is equipped with an LED that flashes to indicate power and that the controller 12 is waiting to receive engine speed pulses. The LED may also be used to gauge whether the controller 12 is functioning correctly. The LED flashes until the automobile reaches a specified RPM at which point the controller 12 changes the positioning of the set screw 138 or the current delivered to the solenoid 96 via the connector wires 78. In a particularly preferred embodiment, the controller 12 maintains the position of the set screw 138 or the amount of current delivered to the solenoid 96 until the engine RPMs fall ten-percent lower than the activation point. This mechanism is called hysteresis. Hysteresis is implemented into the pollution control system 10 to eliminate on/off pulsing, otherwise known as chattering, when engine RPMs jump above or below the set point in a relatively short time period. Hysteresis may also be implemented into the electronically based step system described above.

The controller 12 may also be equipped with an On Delay timer, such as the KH1 Analog Series On Delay timer manufactured by Instrumentation & Control Systems, Inc. of Addison, Ill. A delay timer is particularly preferred for use during initial start up. At low engine RPMs little blow-by gases are produced. Accordingly, a delay timer may be integrated into the controller 12 to delay activation of the set screw 138 or the solenoid 96 and corresponding plunger 94. Preferably, the delay timer ensures that the air flow between the return line 76 and the auxiliary return line 76' remains completely blocked at start-up by disposing the set screw 138 all the way within the interior of the line block 140 of the flow control orifice 19. Additionally, such an on-delay timer may, after opening the flow control orifice 19, ensure that the plunger 94 remains fully inserted within the solenoid 96 such that the front disk 124 remains flush against the flanges 136 thereby limiting the quantity of blow-by gas air flow entering the intake orifice 84. The delay timer may be set to activate release of either one of the disks 124, 126 from the intake orifice 84 after a predetermined duration (e.g. one minute). Alternatively, the delay timer may be set by the controller 12 as a function of engine temperature, measured by the engine temperature sensor 20, engine RPMs, measured by either the engine RPM sensor 28 or the accelerometer sensor 30, or from measurements received from the spark plug sensor 22, the battery sensor 24 or the exhaust sensor 32. The delay may include a variable range depending on any of the aforementioned readings. The variable timer may also be integrated with the RWS switch.

In another alternative embodiment, the controller 12 may automatically sense the number and type of cylinders in the engine via the spark plug sensor 22. In this embodiment, the spark plug sensor 22 measures the delay between spark plug firings among the spark plugs in the engine. A four-cylinder engine has a different sequence of spark plug firings than a six-cylinder, eight-cylinder or twelve-cylinder engine, for example. The controller 12 can use this information to automatically adjust the PCV valve 18 or the flow control orifice 19. Having the capability of sensing the quantity of valves in an automobile engine allows the controller 12 to be automatically installed to the automobile 16 with minimal user intervention. In this regard, the controller 12 does not need to be programmed. Instead, the controller 12 automatically senses the quantity of valves via the spark plug sensor 22 and operates the PCV valve 18 or the flow control orifice 19 according to a program stored in the internal circuitry of the controller 12 designed for the sensed engine.

The controller 12 preferably mounts to the interior of the hood 14 of the automobile 16 as shown in FIG. 1. The controller 12 may be packaged with an installation kit to enable a user to attach the controller 12 as shown. Electrically, the controller 12 is powered by any suitable twelve volt circuit breaker. A kit having the controller 12 may include an adapter wherein one twelve volt circuit breaker may be removed from the circuit panel and replaced with an adapter (not shown) having multiple connections, one for the original circuit and at least a second for connection to the controller 12. The controller 12 includes a set of electrical wires (not shown) that connect one-way to the connector wires 78 of the PCV valve 18 so a user installing the pollution control system 10 cannot cross the wires between the controller 12 and the PCV valve 18. The controller 12 may also be accessed wirelessly via a remote control or hand-held unit to access or download real-time calculations and measurements, stored data or other information read, stored or calculated by the controller 12.

In another aspect of the pollution control system 10, the controller 12 regulates the PCV valve 18 or the flow control orifice 19 based on engine operating frequency. For instance, the controller 12 may activate or deactivate the plunger 94 as the engine passes through a resonant frequency. Alternatively, the controller 12 may selectively position the set screw 138 in the line block 140 based on sensed engine frequencies. In a preferred embodiment, the controller 12 blocks all air flow from the crankcase 34 to the intake manifold 38 until after the engine passes through the resonant frequency. This can be accomplished by positioning the set screw 138 all the way within the line block 140 thereby blocking air flow from the return line 76 to the auxiliary return line 76'. The controller 12 can also be programmed to regulate the PCV valve 18 or the flow control orifice 19 based on sensed frequencies of the engine at various operating conditions, as described above.

Moreover, the pollution control system 10 is usable with a wide variety of engines, including unleaded and diesel automobile engines. The pollution control system 10 may also be used with larger stationary engines or used with boats or other heavy machinery. The pollution control system 10 may include one or more controllers 12, one or more PCV valves 18 and/or one or more flow control orifices 19 in combination with a plurality of sensors measuring the performance of the engine or vehicle. The use of the pollution control system 10 in association with an automobile, as described in detail above, is merely a preferred embodiment. Of course, the pollution control system 10 has application across a wide variety of disciplines that employ combustible materials having exhaust gas production that could be recycled and reused.

In another aspect of the pollution control system 10, the controller 12 may modulate control of the PCV valve 18 and the flow control orifice 19. The primary functionality of the flow control orifice 19 is to control the amount of engine vacuum between the crankcase 34 and the intake manifold 38. The positioning of the set screw 138 within the line block 140 largely dictates the air flow rate of blow-by gases traveling from the crankcase 34 to the intake manifold 38. In some systems, the flow control orifice 19 may simply be an aperture through which selected air flow is configured such that the system does not fall below a certain force according to the original equipment manufacturer (OEM). In the event that the controller 12 fails, the pollution control system 10 defaults back to OEM settings wherein the PCV valve 18 functions as a two-stage check valve. A particularly preferred aspect of the pollution control system 10 is the compatibility with current and future OBD standards through inclusion of a flash-updatable controller 12. Moreover, operation of the pollution control system 10 does not affect the operational conditions of current OBD and OBD-II systems. The controller 12 may be accessed and queried according to standard OBD protocols and flash-updates may modify the bios so the controller 12 remains compatible with future OBD standards. Preferably, the controller 12 operates the PCV valve 18 in conjunction with the flow control orifice 19 to regulate the engine vacuum between the crankcase 34 and the intake manifold 38, thereby governing the air flow rate therebetween to optimally vent blow-by gas within the system 10.

In another aspect of the pollution control system 10, a gas/fuel vapor source 144 (FIG. 2) may couple to the vent line 74 by a check valve 146. The controller 12 regulates the vapor source 144 and the check valve 146. The vapor source 144 preferably includes a source of hydrogen that is selectively injected into the vent line 74 for return back into the intake manifold 38 to supply additional fuel for combustion within the engine 36. Accordingly, the controller 12 selectively operates the check valve 146 to subject the vapor source 144 to the engine vacuum. The engine vacuum draws fuel from the vapor source 144 when the controller 12 opens the check valve 146. The controller 12 may modulate the opening and/or closing of the check valve 146 depending on the operation of the pollution control system 10 and the feedback received from any of the plurality of sensors 20, 22, 24, 25, 26, 28, 30, 32, 33. The vapor source 144 may include, for example, a source of compressed natural gas (CNG) or may include a hydrogen generator that creates hydrogen on-the-fly in proportion to the quantity desired to be supplied to the vent line 74 to optimally aid in the combustion of the blow-by gas and fuel mixed within the intake manifold 38. For example, the hydrogen generator relies on electrical energy to produce hydrogen. At idle, the hydrogen demand may be low due to low engine RPMs and thereby the controller 12 sets the vapor source 144 to produce small quantities of hydrogen at a low voltage. At higher engine RPMs, it is desirable to increase the quantity of hydrogen supplied to the vent line 74. The controller 12 may then increase production of hydrogen at the vapor source 144 by, e.g., increasing the voltage supplied therein. The quantity of fuel supplied through the check valve 146 via the vapor source 144 better optimizes the recycling and combustion of the blow-by gases within the engine 36.

In another aspect of the pollution control system 10, the controller 12 may modulate activation and/or deactivation of the operational components, as described in detail above, with respect to the PCV valve 18, the flow control orifice 19 or the vapor source 144. Such modulation is accomplished through, for example, the aforementioned RWS switch, on-delay timer or other electronic circuitry that digitally activates, deactivates or selectively intermediately positions the aforementioned control components. For example, the controller 12 may selectively activate the PCV valve 18 for a period of one to two minutes and then selectively deactivate the PCV valve 18 for ten minutes. These activation/deactivation sequences may be set according to pre-determined or learned sequences based on driving style, for example. Pre-programmed timing sequences may be changed through flash-updates of the controller 12.

Although several embodiments have been described in some detail for purposes of illustration, various modifications may be made to each without departing from the scope and spirit of the invention. Accordingly, the invention is not to be limited, except as by the appended claims.

What is claimed is:

1. A pollution control system, comprising:
    a controller coupled to a sensor monitoring an operational characteristic of a combustion engine;
    a PCV valve having an inlet and an outlet adapted to vent blow-by gas out from the combustion engine, the PCV valve comprising a two-stage check valve, the first stage directed by the controller, and the second stage compatible with OEM settings wherein the check valve opens only under sufficient vacuum sure in the event the controller fails; and
    a fluid regulator associated with the PCV valve and responsive to the controller for selectively modulating engine vacuum pressure to adjustably increase or decrease a fluid flow rate of blow-by gas venting from the combustion engine, the fluid regulator comprising a flow control orifice.

2. The system of claim 1, wherein the controller decreases the engine vacuum pressure during periods of decreased blow-by gas production to decrease the fluid flow rate through the PCV valve, and increases the engine vacuum pressure during periods of increased blow-by gas production to increase the fluid flow rate through the PCV valve.

3. The system of claim 1, wherein the controller includes a pre-programmed software program, a flash-updatable software program, or a behavior-learning software program.

4. The system of claim 1, wherein the controller adjustably positions the fluid regulator to vary the engine vacuum pressure based, in part, on measurements from the sensor.

5. The system of claim 1, wherein the controller includes a window switch coupled to an engine RPM sensor, wherein the fluid regulator is selectively positionable based on a pre-determined engine RPM or multiple engine RPMs set by the window switch.

6. The system of claim 1, wherein the controller activates and/or deactivates the fluid regulator at an engine frequency or a set of engine frequencies.

7. The system of claim 1, wherein the controller includes a wireless transmitter or a wireless receiver.

8. The system of claim 1, wherein the inlet connects to a crankcase and the outlet connects to an intake manifold of an internal combustion engine.

9. The system of claim 1, wherein the flow control orifice comprises a set screw and line block.

10. The system of claim 1, wherein the controller includes an on-delay timer that sets the fluid regulator to preclude fluid flow for a predetermined duration after activation of the combustion engine.

11. The system of claim 10, wherein the predetermined duration is a function of time, engine temperature, or engine RPM.

12. The system of claim 1, wherein the sensor comprises an engine temperature sensor, a spark plug sensor, an accelerometer sensor, a PCV valve sensor, or an exhaust sensor.

13. The system of claim 12, wherein the operational characteristic comprises an engine temperature, a quantity of engine cylinders, a real-time acceleration calculation, or an engine RPM.

14. The system of claim 1, including a supplemental fuel fluidly coupled to the PCV valve and the fluid regulator.

15. The system of claim 14, including a one-way check valve electronically coupled to the controller for selectively modulating release of the supplemental fuel to the PCV valve and the fluid regulator.

16. The system of claim 15, wherein the supplemental fuel comprises a compressed natural gas (CNG) or a hydrogen gas.

17. The system of claim 16, including a hydrogen generator associated with the controller and responsive thereto for making the hydrogen gas on demand.

* * * * *

UNITED STATES PATENT AND TRADEMARK OFFICE
CERTIFICATE OF CORRECTION

PATENT NO.        : 8,370,048 B2                               Page 1 of 1
APPLICATION NO.   : 12/565904
DATED             : February 5, 2013
INVENTOR(S)       : Serge V. Monros It is certified that error appears in the above-identified patent and that said Letters Patent is hereby corrected as shown below:

In the Claims

In column 17, line 34 (Claim 1), delete "sure" and insert -- pressure --.

Signed and Sealed this
Eleventh Day of March, 2014

Michelle K. Lee
*Deputy Director of the United States Patent and Trademark Office*